J. Mathis.
Loom Temple.
No. 2,534. Reissued Mar. 26, 1867.
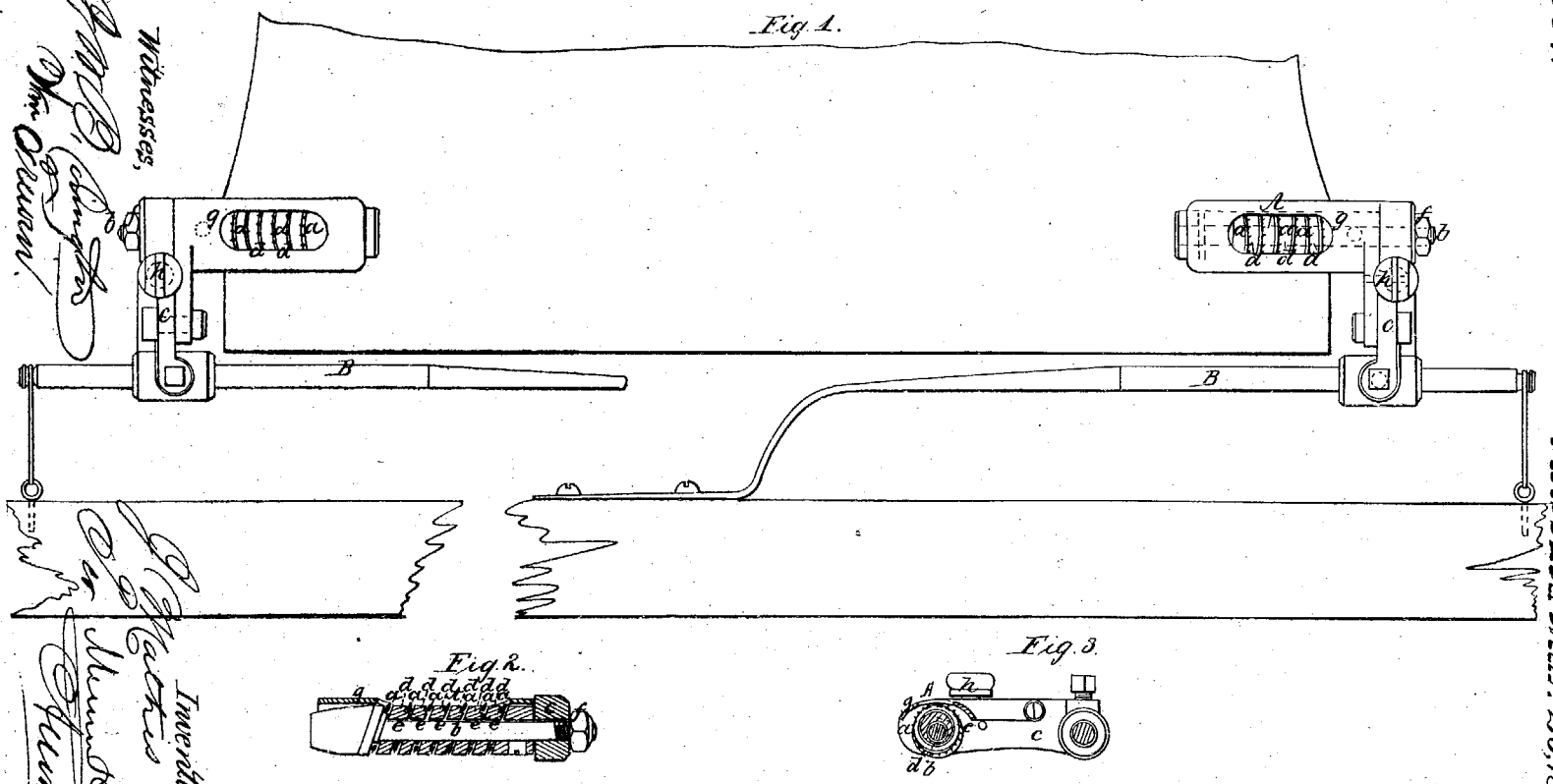
Witnesses,
J. W. B. Langton
Wm. Drum.
Inventor,
J. Mathis
per Munn & Co
Attorneys
N. PETERS, PHOTO-LITHOGRAPHER, WASHINGTON, D. C.

United States Patent Office.

HENRY KAYSER, OF NEW YORK, N. Y., ASSIGNEE OF J. MATHIS.

*Letters Patent No.* 54,269, *dated April* 24, 1866; *antedated March* 14, 1861; *reissue No.* 2,534, *dated March* 26, 1867.

IMPROVEMENT IN ROLLER TEMPLES FOR LOOMS.

The Schedule referred to in these Letters Patent and making part of the same.

TO ALL WHOM IT MAY CONCERN:

Be it known that J. MATHIS, of Dornbein, Empire of Austria, did invent a new and useful Improvement in Temples for Looms, for which Letters Patent No. 54,269 were granted to me, H. KAYSER, of corner Twenty-Second street and Second avenue, of the city, county, and State of New York, as the sole assignee of said MATHIS; and I do hereby declare that the following is a full, clear, and exact description thereof, which will enable those skilled in the art to make and use the same, reference being had to the accompanying drawing, forming part of this specification, in which—

Figure 1 represents a plan or top view of this invention.

Figure 2 is a longitudinal central section of the same.

Figure 3 is a transverse section of the same.

Similar letters of reference, in these views, indicate corresponding parts.

This invention relates to a revolving temple with automatic tension produced by providing the surface of the temple with wheels set in an oblique position, and which are furnished with spurs in such a manner, that, by the revolution of said temple, a lateral tension of uniform power is exerted on the fabric on which the temple acts, and a fabric of uniform width and density can be produced, and, furthermore, the tearing of the selvages is avoided. The temple is also so constructed that the lateral tension which it produces on the fabric can be increased or decreased at pleasure.

A A represent a pair of these temples, one right and the other left. These temples are adjustable on rods B which are secured to the breast-beam of the loom, by screws or other means, in the usual manner, and by moving the temples on said rods they can be adjusted to the width of the fabric to be woven. Each of these temples is composed of a series of rollers, *a*, the peripheries of which are provided with spurs, and which are placed in an oblique position at suitable distances apart. The rollers are made in the form of wheels which are secured in an oblique position on the pin *b*, that is firmly secured in the arm *c*, and said wheels are kept at the proper distance apart by means of disks *d* interposed between them. These disks are provided with shoulders *e* (see fig. 2) of such depth that the wheels *a* will not be clamped when the disks are forced close together, and that said wheels are free to revolve on said shoulders in either direction. The shoulders of the disks, however, are not concentric to the peripheries of said disks, and the diameters of the wheels *a* are smaller than those of the disks *d*, so that the points of said wheels will rise above the peripheries of the disks only for about one-half of the circumference. The pin *b* is secured in the arm *c* by a nut, *f*, so that the same, together with the disks *d* and wheels *a*, can be turned in either direction, and a cap, *g*, which is hinged to the arm *c* and held down by an adjustable button, *h*, keeps the fabric in contact with the upper part of the wheels *a*. As the fabric passes through between the cap and the wheels *a* (being drawn along by the action of the loom) the rollers with the wheels revolve and the fabric is stretched laterally, since those teeth or prongs of the two temples which simultaneously take hold of the fabric at or near its edges, move apart on account of the oblique position of the wheels. The amount of strain exerted by the temples on the fabric, by reason of the oblique position of the wheels, can be determined by the distance of a vertical line drawn through the prong of one of the wheels, which first takes hold of the fabric from another vertical line drawn through the same prong at the moment the same passes its highest position, which is the moment when said prong releases the fabric. The obliquity of the wheels *a* can be adjusted by turning the pins *b* in the arms *c*, and the lateral strain exerted by the temples on the fabric can be adapted to the nature of the fabric to be woven, and, if desired, said strain can be reduced to nothing.

By this arrangement temples are obtained which form regulators for the uniform thickness of the fabric, because, if the weaver fails to give a uniform tension to the warp-beam, the tension produced by the temples becomes irregular, and this inequality would be visible to the attendant inasmuch as the independent action of each wheel would allow the cloth to gather, or the cloth would not pass those wheels which had not been caused to revolve or which had moved slower than the others; furthermore, the breadth of the fabric, no matter how heavy or wide, can be kept uniform from beginning to end. My temples are readily applied to looms of any desired construction, and they cover up but a very small area of the fabric, so that all defects can be readily detected; they are not liable to get out of order, and if one of the wheels should wear out it can be easily removed and replaced by a new one.

What I claim as new, and desire to secure by Letters Patent, is—

1. A temple provided with a series of wheels set in an oblique direction, substantially as and for the purpose described.

2. Giving to each of the oblique wheels an independent revolving motion substantially as and for the purpose set forth.

3. The eccentric shoulders *e* on the disks *d*, which separate the oblique wheels *a*, substantially as and for the purpose described.

HENRY KAYSER.

Witnesses:

RUDOLPH WÜSTE,

W. HAUFF.